US009683630B2

(12) United States Patent
Vollbarth et al.

(10) Patent No.: US 9,683,630 B2
(45) Date of Patent: Jun. 20, 2017

(54) TIMING BELT WITH A BELT LOCK

(71) Applicant: SIG Technology AG, Neuhausen am Rheinfall (CH)

(72) Inventors: Jurgen Vollbarth, Porta Westfalica (DE); Bernd von Birgelen, Waldfeucht (DE); Markus Klaus, Eschweiler (DE)

(73) Assignee: SIG Technology AG, Neuhausen am Rheinfall (CH)

(*) Notice: Subject to any disclaimer, the term of this patent is extended or adjusted under 35 U.S.C. 154(b) by 0 days.

(21) Appl. No.: 15/021,084

(22) PCT Filed: Jul. 30, 2014

(86) PCT No.: PCT/EP2014/066396
§ 371 (c)(1),
(2) Date: Mar. 10, 2016

(87) PCT Pub. No.: WO2015/036163
PCT Pub. Date: Mar. 19, 2015

(65) Prior Publication Data
US 2016/0215852 A1    Jul. 28, 2016

(51) Int. Cl.
F16G 1/28 (2006.01)
F16G 5/20 (2006.01)
F16G 13/02 (2006.01)
F16G 15/00 (2006.01)
F16G 3/00 (2006.01)
F16G 3/08 (2006.01)

(52) U.S. Cl.
CPC   *F16G 3/08* (2013.01); *F16G 1/28* (2013.01)

(58) Field of Classification Search
CPC ....... B29C 66/71; B29C 66/1142; F16G 3/00; F16G 3/02; F16G 1/28
USPC ................. 474/205, 253, 219, 202
See application file for complete search history.

(56) References Cited

U.S. PATENT DOCUMENTS

| 3,342,656 | A | * | 9/1967 | Papageorges ....... B29C 66/5241 156/159 |
| 3,664,490 | A | * | 5/1972 | Maruyama ............. B65G 17/02 198/847 |
| 3,744,095 | A | * | 7/1973 | Tomlinson ............... F16G 3/00 24/31 W |
| 3,833,998 | A |   | 9/1974 | Tomlinson |
| 3,924,301 | A | * | 12/1975 | Fox ........................ F16G 3/00 24/31 H |

(Continued)

FOREIGN PATENT DOCUMENTS

| CN | 202274045 U | 6/2012 |
| CN | 202971737 U | 6/2013 |

(Continued)

*Primary Examiner* — Henry Liu
(74) *Attorney, Agent, or Firm* — The Webb Law Firm

(57) ABSTRACT

The application describes and illustrates a timing belt, particularly a toothed belt, having a first end, a second end, a rear side, a front side, and having a plurality of teeth arranged on the rear side and/or the front side, wherein the first end has at least one cutaway, wherein the second end has at least one tine that is insertable into the cutaway, and wherein the first end and the second end are detachably connectable to each other and the teeth of the first end have an offset relative to the teeth of the second end in the connected condition under no tension.

10 Claims, 6 Drawing Sheets

(56) References Cited

U.S. PATENT DOCUMENTS

| | | | | |
|---|---|---|---|---|
| 4,298,343 A * | 11/1981 | Redmond, Jr. | | B29D 29/08 24/38 |
| 4,437,849 A * | 3/1984 | Berg | | F16G 3/00 198/812 |
| 4,541,823 A * | 9/1985 | Marsh | | B29D 29/08 156/138 |
| 4,642,081 A * | 2/1987 | Balomenos | | F16G 5/00 24/31 B |
| 4,650,446 A * | 3/1987 | Pinto | | B29D 29/08 474/253 |
| 4,705,495 A * | 11/1987 | Madion | | F16G 7/06 156/304.5 |
| 5,092,823 A * | 3/1992 | Longo | | F16G 1/00 474/253 |
| 5,136,832 A * | 8/1992 | Sund | | A01D 41/10 24/31 B |
| 5,724,706 A * | 3/1998 | Jakob | | F16G 3/00 24/31 C |
| 5,988,927 A * | 11/1999 | Pfarr | | F16G 1/00 24/115 F |
| 6,695,134 B2 * | 2/2004 | Rubino | | F16G 3/04 198/844.2 |
| 6,843,744 B2 * | 1/2005 | Gregg | | F16G 3/00 474/218 |
| 7,344,020 B2 * | 3/2008 | Grywacheski | | B65G 15/30 198/844.2 |
| 7,594,574 B2 * | 9/2009 | Mol | | B29C 65/564 198/844.2 |
| 8,002,110 B2 * | 8/2011 | DeGroot | | B29C 65/564 198/844.2 |
| 8,365,906 B2 | 2/2013 | Moeschen-Siekmann et al. | | |
| 8,454,464 B2 * | 6/2013 | Pasch | | B29D 29/08 156/137 |
| 8,663,521 B2 * | 3/2014 | Frey | | B29C 65/5042 198/844.2 |
| 8,714,345 B2 * | 5/2014 | Frey | | F16G 1/28 198/844.2 |
| 9,234,563 B2 * | 1/2016 | Richter | | F16G 1/16 |
| 2003/0146072 A1 * | 8/2003 | Rubino | | F16G 3/04 198/844.2 |
| 2004/0195079 A1 * | 10/2004 | Webster | | B65G 15/52 198/844.2 |
| 2007/0267277 A1 * | 11/2007 | Mol | | B29C 65/564 198/844.2 |
| 2008/0207370 A1 * | 8/2008 | Jakob | | F16G 3/08 474/257 |
| 2010/0029426 A1 * | 2/2010 | Pons Sanchez | | F16G 1/28 474/206 |
| 2011/0111901 A1 * | 5/2011 | Chiang | | F16G 1/28 474/205 |
| 2011/0168529 A1 * | 7/2011 | Vincenzi | | F16G 3/08 198/844.2 |
| 2013/0062168 A1 * | 3/2013 | Frey | | F16G 1/28 198/844.2 |
| 2013/0256101 A1 * | 10/2013 | Gentz | | F16G 3/10 198/847 |
| 2014/0106918 A1 * | 4/2014 | Richter | | F16G 1/16 474/202 |

FOREIGN PATENT DOCUMENTS

| | | |
|---|---|---|
| CN | 203023390 U | 6/2013 |
| CN | 102575747 B | 1/2016 |
| DE | 2322343 A1 | 11/1973 |
| DE | 4442927 A1 | 6/1996 |
| DE | 102004025170 A1 | 12/2005 |
| EP | 0836035 A2 | 4/1998 |
| EP | 2584218 A2 | 4/2013 |
| WO | 2009040628 A1 | 4/2009 |
| WO | 2010015919 A2 | 2/2010 |

* cited by examiner

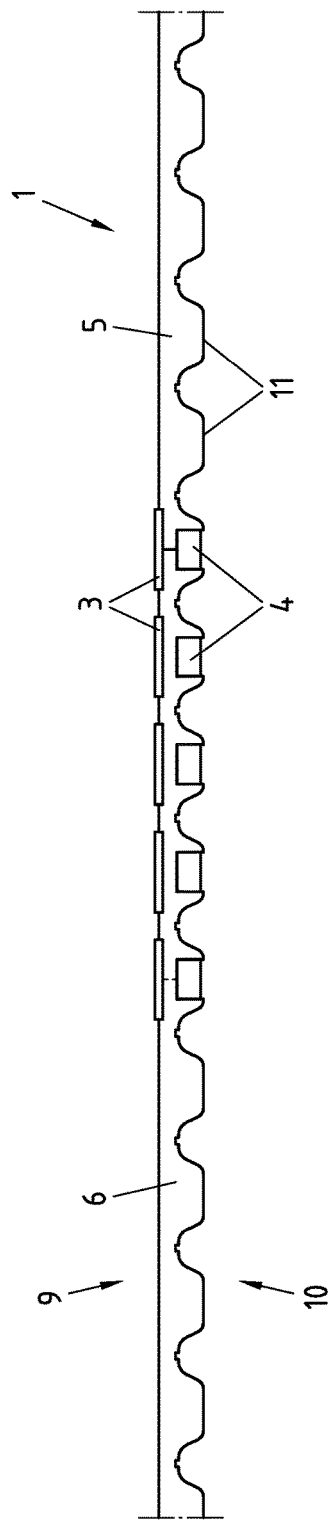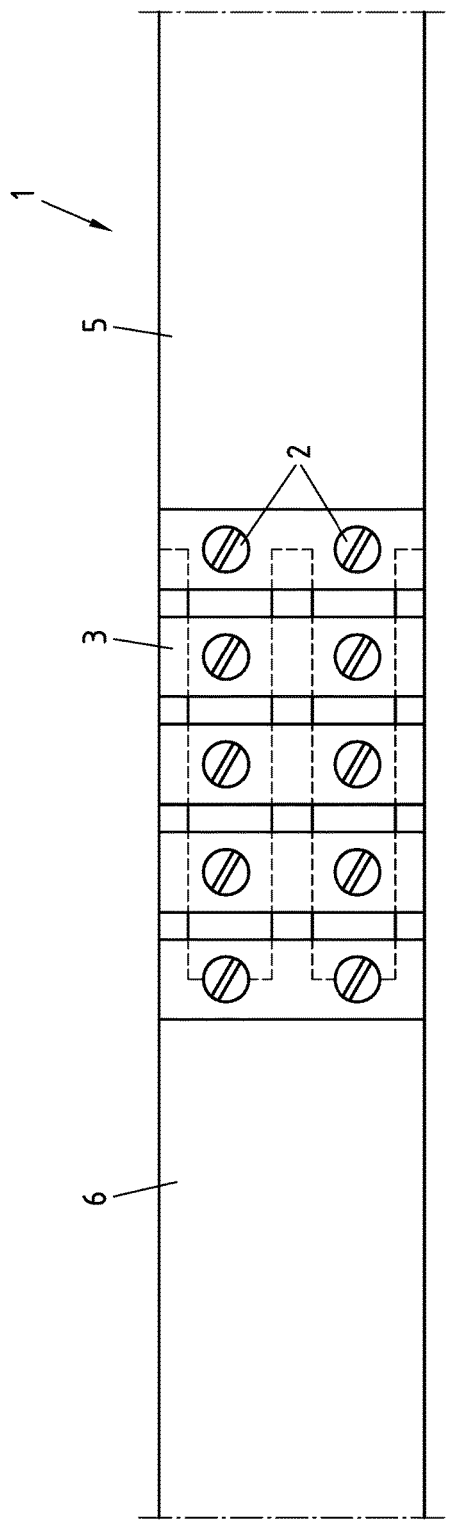

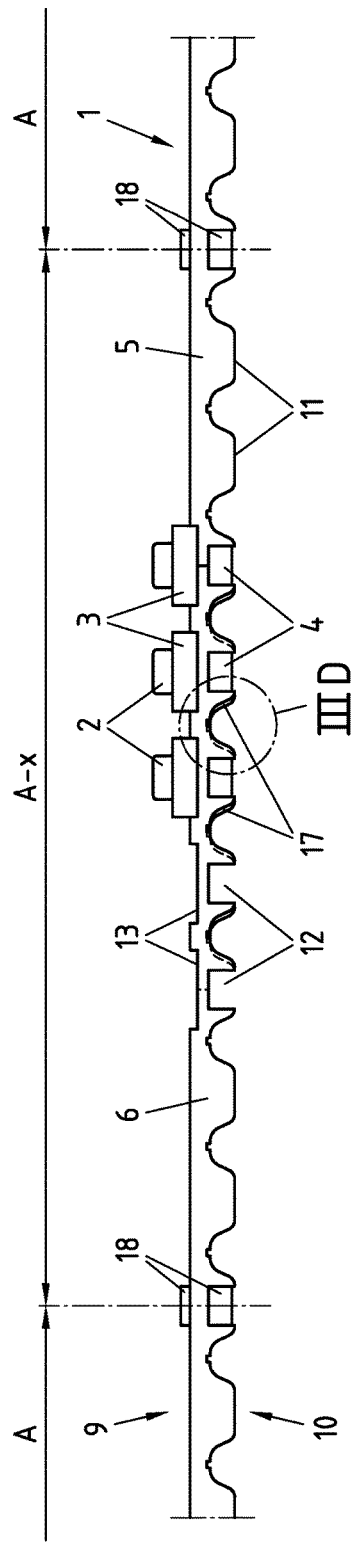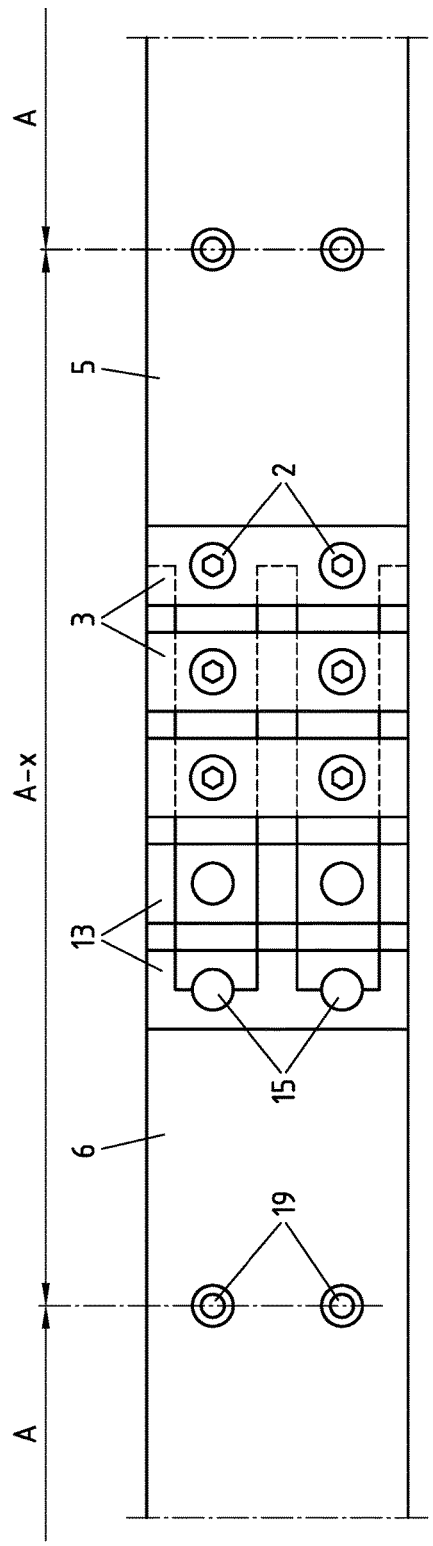
Fig.3A
Fig.3B

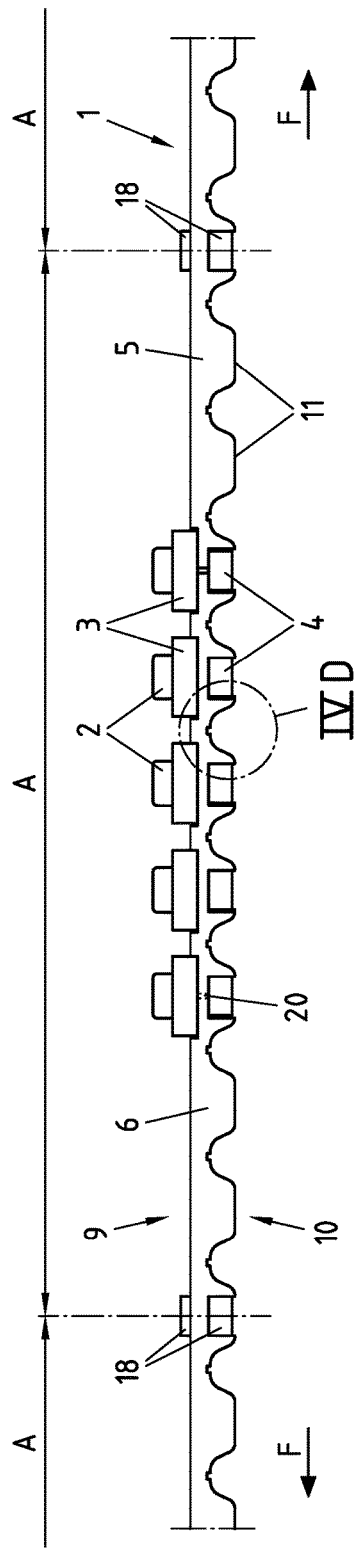
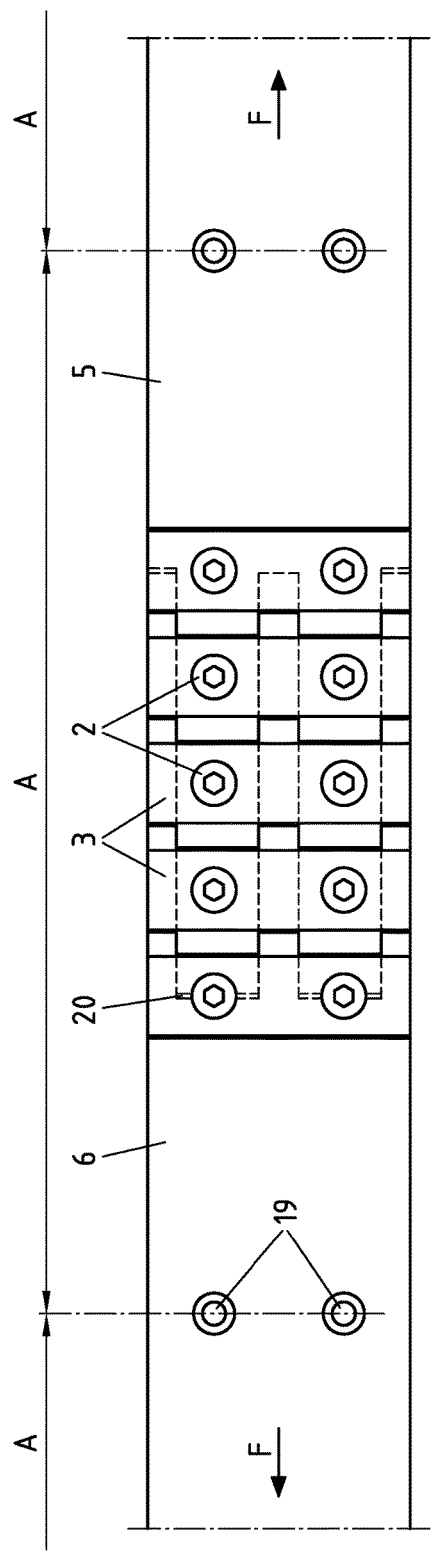
Fig.4A
Fig.4B

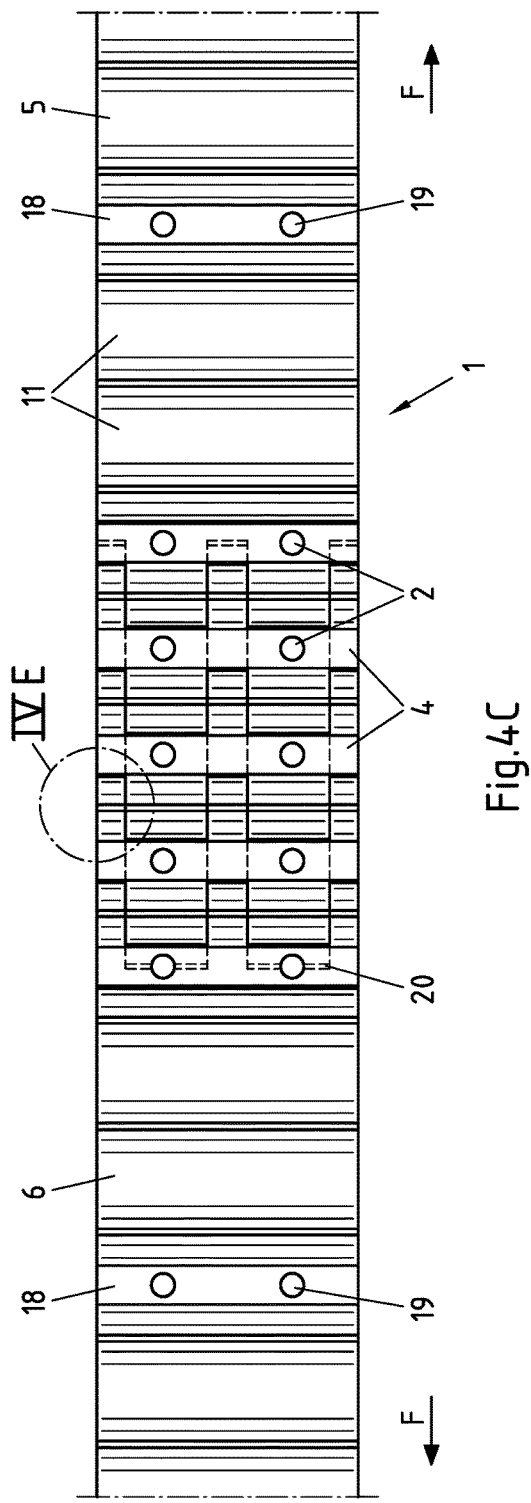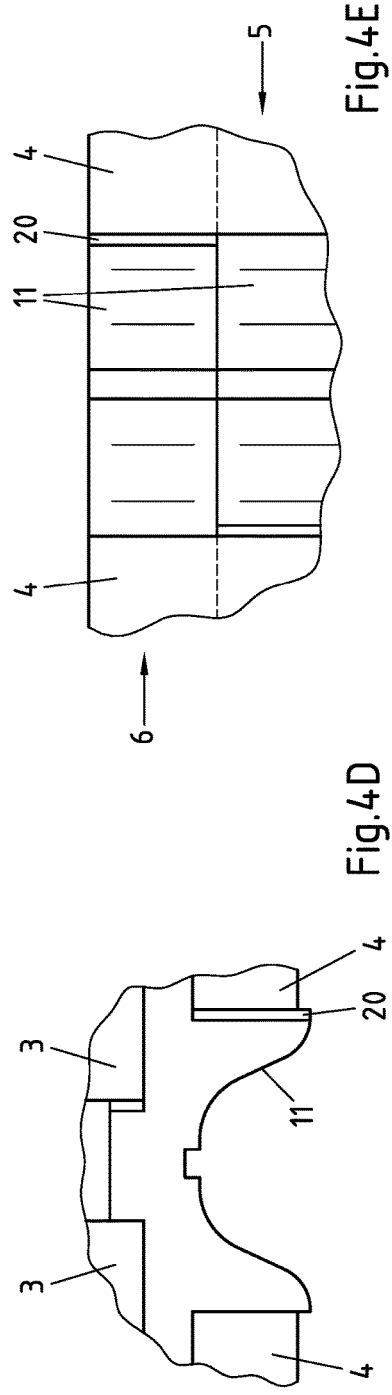

TIMING BELT WITH A BELT LOCK

CROSS-REFERENCE TO RELATED APPLICATIONS

This application is the United States national phase of International Application No. PCT/EP2014/066396 filed Jul. 30, 2014, and claims priority to German Patent Application No. 10 2013 110 027.9 filed Sep. 12, 2013, the disclosures of which are hereby incorporated in their entirety by reference.

BACKGROUND OF THE INVENTION

Field of the Invention

The invention relates to a timing belt, particularly a toothed belt, having a first end, a second end, a rear side, a front side, and having a plurality of teeth arranged on the rear side and/or the front side, wherein the first end has at least one cutaway, wherein the second end has at least one tine that is insertable into the cutaway, and wherein the first end and the second end are detachably connectable to each other by connecting means.

Timing belts and particularly toothed belts are known in many different designs. Toothed belts are positive locking driving or transporting elements that are furnished with teeth at regular intervals. Toothed belts are usually passed over a number of pulleys, wherein the pulleys may have tooth gaps, the distances between which match the distances between the teeth on the toothed belt. In this way, the teeth of the toothed belt may engage in the tooth gaps on the pulley to create a positive locking connection. By virtue of this positive locking engagement, unlike flat or V-belts, toothed belts run synchronously and the function thereof is highly efficient.

Toothed belts are often made from plastic. In order to increase tensile strength, many toothed belts include reinforcing means of metal or fibres with outstanding tensile strength. Such tensile means may be for example metal wires, which are embedded in the base material of the belt, for example plastic.

Timing belts and toothed belts are often designed as endless belts, that is to say closed belts with no "beginning" and no "end". Endless belts have the advantage that the belt does not have a weak point and possesses exactly the same properties over the entire length thereof. In particular, endless belts have an almost constant (tensile) stiffness throughout their entire length, so that when a load placed on the belt, expansion takes place evenly over the entire length of the belt. This enables particularly effective synchronised running of the belt.

However, endless belts have the disadvantage that it can be difficult to install and remove them. In order to install or remove an endless belt, the belt must be mounted on the pulleys as a single part from top to bottom. Accordingly, there has been a long-held desire to be able to open and close such a driving belt in the same way as a buckle belt. Such a device for opening and closing a belt is also called a "belt lock".

Description of Related Art

Options for opening and closing a belt are known for example from DE 44 42 927 A1 and DE 2 322 343 A. Both documents include similar suggestions to provide tongues and cutouts on the ends of the belt, which may then be inserted in one another. Holes are provided in the teeth and extend transversely to the longitudinal direction of the belt through the entire length of the teeth in the direction of the belt width. Locking pins are pushed through the holes to create a positive locking connection between the two ends of the belt.

Another belt lock is known from DE 10 2004 025 170 A1. Here too, it is suggested to provide tongue/cutout-connections on both ends of the toothed belt. Circumferential grooves are formed in the connectors. Elastic connecting clamps made from sheet metal are designed to reach around the connectors, engage in the grooves, and in so doing connect the two ends of the toothed belts in positive locking manner in the area of the connectors.

A further known option for connecting the two ends of the toothed belt is illustrated in FIGS. 1, 2A and 2B, and is explained in greater detail in the section of the description reserved designated therefor.

A drawback associated with the belt locks described is the fact that the area around the lock of the belt does not have any continuous tension members, and therefore has less tensile strength than in the rest of the belt. Consequently, when a constant tensile load is applied, the area around the lock undergoes greater elongation than the rest of the belt. This is due particularly to the fact that the tensile elements that are essential for the (tensile) stiffness of the belt are split in the area of the lock, necessarily due to the design. However, the lock itself is not regularly able to increase the tensile stiffness to that of the rest of the belt.

Disproportionate elongation of the belt in the area of the belt lock has a number of disadvantages. First, unevenly distributed elongation causes the teeth to become unevenly spaced. As a result, engagement of the teeth in the tooth gaps on the pulleys is imprecise, and surfaces become more susceptible to wear.

Secondly, uneven elongation of a belt being used for transportation causes the distances between the elements mounted on the belt to be changed unevenly under load. Such mounted elements may be for example shaped sections or adapters to which transport containers may be fastened. A problem may arise in that the mounted elements are at a constant distance from each other when the belt is unloaded, but are not at a constant distance from each other when the belt is under load. In particular, the problem may arise that the distance between the mounted elements increases at a greater rate in the area around the lock than over the rest of the belt. One of the several reasons a constant distance between transportation containers under load is desirable and necessary is therefore to ensure that the containers can be loaded and unloaded reliably.

SUMMARY OF THE INVENTION

The object of the invention is therefore to design and develop a timing belt described in the introduction and explained in greater detail in the preceding in such manner that excessive elongation in the area of the belt lock is prevented.

This object is solved with a timing belt that in the connected condition under no tension the teeth of the first end have an offset relative to the teeth of the second end.

In this context, an offset is understood to mean a staggered or shifted position of the teeth on the first belt end in the lengthwise direction of the belt relative to the teeth of the second belt end. This offset should occur in the unloaded condition, that is to say in a condition in which the belt is not under lengthwise tension. Of course an offset only occurs in the connected condition, that is to say a condition in which both ends of the belt are connected to one another and form a closed loop. The offset results in undersizing; when not under tension, the belt is therefore slightly too short in the area of the lock. The offset serves to counter the drawback according to which the belt has reduced tensile stiffness in the area of the lock, that is to say in the area where the two ends are connected. Because, depending on application in which it is used, a timing belt may have to be operated under a certain pretension or operating tension in any case. In known belts, this tension leads to unacceptable elongation of the belt in the area of the belt lock. By contrast, the elongation in the rest of the belt is negligible.

The invention takes account of the principle that the belt should be "shortened" by a certain length in the area of the belt lock, and that this length should match the expected elongation of the belt in the area of the belt lock during operation as exactly as possible. This shortening is enabled by an offset of the tooth flanks in the area of the belt lock. In other words, according to the invention the tooth flanks on the one end of the belt are not aligned with the tooth flanks on the other end of the belt when the belt is not under tension. The offset does not disappear and the belt does not reach its desired, nominal length until it is loaded with a tensile stress. The critical tooth flanks are also brought into alignment again in the loaded state. The belt is thus optimised with regard to a certain pretension and operating load.

According to an advantageous variation of the invention, it is provided that the offset has a length between 0.1 mm and 1.5 mm. Experiments have revealed that an offset in the range indicated enables very good results for many typical operating tensions of the belt.

In a further variation of the invention, it is suggested that the timing belt has back panels and/or inserts as connecting means. Back panels and inserts serve to create a particularly reliable clamping connection, for example by means of screws. The back panels may serve for example to introduce the tensile forces arising through the screwed connection into the belt via a very large surface area. In this way, the compressive load acting on the belt may be kept as low as possible and deformations or damage to the belt may be prevented. The back panels may be made from steel, for example. The inserts may be made from a similar or identical material to the belt teeth, and may have an inner thread, for example an inner thread of steel. Preferably, both the back panels and the inserts extend over the entire width of the belt, covering all of the tines. In order to preserve the flexibility of the belt, a dedicated back panel and insert may be assigned to each individual tooth.

A further teaching of the invention provides that the tines have recesses on the rear side thereof to accommodate the back panels. The recesses help with positioning the back panels, thus serving as installation aids. The recesses also create a form-fitting end stop for the back panels, thereby rendering the connection of the two belt ends yet more reliable. The depth of the recesses preferably corresponds to the thickness of the back panels, so that a completely smooth rear side of the belt is created. This reduces the risk of the circulating belt colliding with or rubbing along the surface of adjacent components. A tine is understood to mean a projection or "finger", which may be rectangular, inclined, or even rounded. In particular, the tines may be longer than they are wide.

According to a further variation of the invention, the tines have grooves on the front side thereof to accommodate the inserts. The grooves also help with positioning the inserts, thus serving as installation aids. The grooves also create a form-fitting connection between the inserts and belt. Finally, the depth of the grooves is preferably also equal to the thickness of the inserts, in order to maintain the shape of the teeth. A groove is understood to mean a type of recess that is designed to accommodate the inserts.

In a further refinement of the invention, it is provided that the grooves and/or recesses are aligned eccentrically relative to the teeth in the longitudinal direction of the belt. The grooves and/or recesses are intentionally arranged off centre with respect to the teeth in order to create an asymmetrical arrangement. The eccentric arrangement of the grooves and/or recesses is an extremely simple structural way to create an offset between the teeth on the two belt ends. In particular, the eccentric arrangement of the grooves and/or recesses may be used to precisely define a required offset, so that the offset does not need to be adjusted manually at installation.

A further teaching of the invention provides that the tines on the first and/or second end(s) have through holes that extend from the rear side to the front side of the belt. The route of the through holes from the rear to the front represents the shortest path through the belt. Unlike the holes described in the introduction in documents DE 44 42 927 A1 and DE 2 322 343 A, therefore, the holes according to the invention do not have to pass through the entire length of the teeth; instead, they pass transversely through the teeth. The advantage of keeping the holes as short as possible consists in that a clamping connection with very high holding force can be created without having to worry about deformation of the belt.

According to a further refinement of the invention, the timing belt has connecting elements. In order to fasten the connecting elements, the timing belt preferably has through holes. The through holes and the connecting elements enable the belt to be used as a means for transportation. The connecting elements may be for example shaped sections or adapters, to which the transport containers may be fastened.

In a further variant of the invention, it is provided that the tines and the recesses are from six to fourteen, particularly from eight to twelve teeth long. The length of the tines and recesses determines the length of the belt lock. On the one hand, the length of the belt lock should be kept within limits, because the tensile strength of the belt is lower in this area. On the other hand, if the belt lock is too small, a reliable connection between the two ends of the belt cannot be assured. Lengths from six to fourteen, particularly from eight to twelve teeth have proven to represent a particularly good compromise.

Finally, in a further refinement of the invention it is suggested that the timing belt be made from plastic and comprise tension elements of metal, particularly steel. Plastics are particularly suitable due to their low cost, high elasticity and their exceptional versatility in terms of shaping. Tension elements of steel are notable for their very high tensile strength. The properties of both materials may be combined advantageously by embedding tension elements of steel in the plastic. Alternatively, the tension elements may be made from any other material that is capable of withstanding a tensile load, for example glass fibres (Kevlar), carbon fibres or textile fibres.

BRIEF DESCRIPTION OF THE DRAWINGS

In the following, the invention will be explained in greater detail with reference to a drawing that illustrates only one preferred embodiment thereof. In the drawing:

FIG. 2A shows a side view of the timing belt of FIG. 1 in the mounted condition;

FIG. 2B shows a top view of the timing belt of FIG. 1 in the mounted condition;

FIG. 3A shows a side view of a timing belt with offset according to the invention in the mounted condition under no tension;

FIG. 3B shows a top view of the timing belt of FIG. 3A in the mounted condition under no tension;

FIG. 4A shows a side view of a timing belt according to the invention in the mounted condition under tension;

FIG. 4B shows a top view of the timing belt of FIG. 4A in the mounted condition under tension;

FIG. 4C is a view from below of the timing belt of FIG. 4A in the mounted condition under tension;

FIG. 4D is a detail view of the area of the timing belt designated with "IV D" in FIG. 4A;

FIG. 4E is a detail view of the area of the timing belt designated with "IV E" in FIG. 4C.

DETAILED DESCRIPTION OF THE INVENTION

Figure 1:
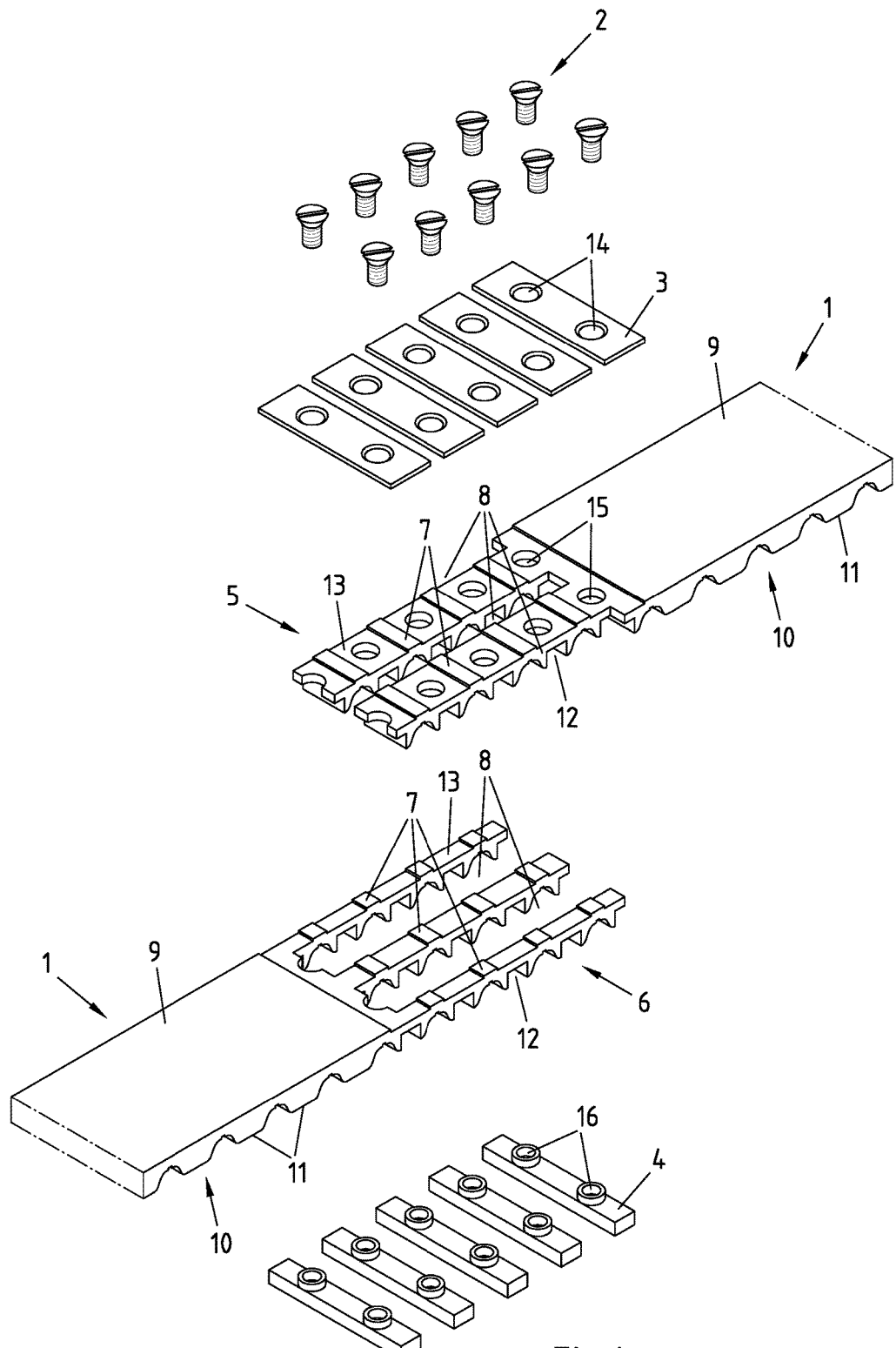
FIG. 1 shows a perspective view of a timing belt known from the prior art with connecting elements, in the unmounted condition.

FIG. 1 shows a perspective view of a timing belt 1 known from the prior art, having connecting elements and in the unmounted condition. The connecting elements are screws 2, back panels 3 and inserts 4. The timing belt 1 shown in FIG. 1 is a toothed belt with a first end 5 and a second end 6.

The first end 5 of timing belt 1 has two tines 7 and three recesses 8. One of the recesses 8 is arranged between the two tines 7, while the other two recesses 8 are arranged to one side of tines 7. In the same way, second end 6 of timing belt 1 has three tines 7 and two recesses 8, wherein the two recesses 8 are arranged between the three tines 7 in the manner shown in FIG. 1.

First end 5 and second end 6 of timing belt 1 are shaped so as to complement one another. This means that tines 7 of first end 5 fit exactly into recesses 8 on second end 6. In the same way tines 7 of second end 6 fit perfectly in recesses 8 on first end 5. When the two ends 5 and 6 are pushed into one another, therefore, tines 7 and recesses 8 complement each other perfectly to form a smooth, unbroken surface (see also FIG. 2B).

Timing belt 1 has a flat rear side 9 and a front side 10. Teeth 11 are arranged on front side 10.

Tines 7 have grooves 12 on front side 10, which extend transversely to the longitudinal direction of belt 1, in the middle of teeth 11. Grooves 12 serve to accommodate inserts 4. Tines 7 also have recesses 13 on the rear side thereof. Recesses 13 serve to accommodate back panels 3, and they also extend centrally with respect to teeth 11. Back panels 3 are furnished with through holes 14. In similar manner, tines 7 of first end 5 have through holes 15. Finally, inserts 4 have apertures 16 that are aligned with screws 2.

The two ends 5, 6 of belt 1 may be connected to one another by pushing the tines 7 of one end into the recesses 8 in the respective other end. Then, back panels 3 are positioned in recesses 13 and inserts 4 are inserted in grooves 12. As soon as back panels 3 are in position, and particularly inserts 4 are engaged, a positive locking connection between the two ends 5, 6 of belt 1 is created. The positive locking connection is supplemented by a screw connection. For this purpose, screws 2 are passed through holes 14, 15 and screwed into apertures 16. In this manner besides the form-fitting connection, a force-fitting connection is also established between the two ends 5, 6 of belt 1, that is to say a clamping connection.

FIGS. 2A and 2B show a side view (FIG. 2A) and a top view (FIG. 2B) of the rear side 9 of the timing belt 1 of FIG. 1 in the mounted state. The features described earlier with reference to FIG. 1 are designated in FIGS. 2A and 2B and in all subsequent figures with the same reference signs.

FIG. 3A shows a side view of a timing belt 1 with an offset 17 according to the invention in the mounted state but under no tension. One difference between this timing belt 1 and the belt of FIGS. 1 to 2B consists in that an offset 17 is provided between the teeth 11 of tines 7 on the first end 5 and the teeth 11 of tines 7 on the second end 6. In other words, the flanks of teeth 11 are not aligned with each other in the area of the belt lock, but rather staggered with respect to each other. This may be achieved for example by arranging grooves 12 and/or recesses 13 not exactly in the middle of the teeth, but rather eccentrically. This has a similar effect to that which would be achieved if tines 7 of the two ends 5, 6 were pushed "too far" into the recess 8 in the respective other end 6, 5. The result of providing an offset 17 is thus that distance A between a defined number of teeth 11 (in FIG. 3A: ten teeth) is shortened by a length X, corresponding to offset 17, in the area of the belt lock. Consequently, the timing belt 1 shown in FIG. 3A has an undersize in the condition without loading.

Another point of difference with the timing belt 1 shown in FIGS. 1 to 2B consists in that the timing belt 1 represented in FIG. 3A has connecting elements 18 that are fastened in through holes 19 provided in timing belt 1. The connecting parts can be connected with the timing belt 1 by the connecting elements 18. This is necessary for example if belt 1 is used not as a drive belt but as a transport belt. In the case of the timing belt 1 shown in FIG. 3A, connecting elements 18 are at a distance A from each other that corresponds to the distance of ten teeth 11. An exception applies for the area of the belt lock where distance A is shorter by length X due to offset 17. This shortening by length X is also evident in FIG. 3B, which shows a top view of the timing belt 1 of FIG. 3A in the mounted condition under no loading.

Figure 3C:
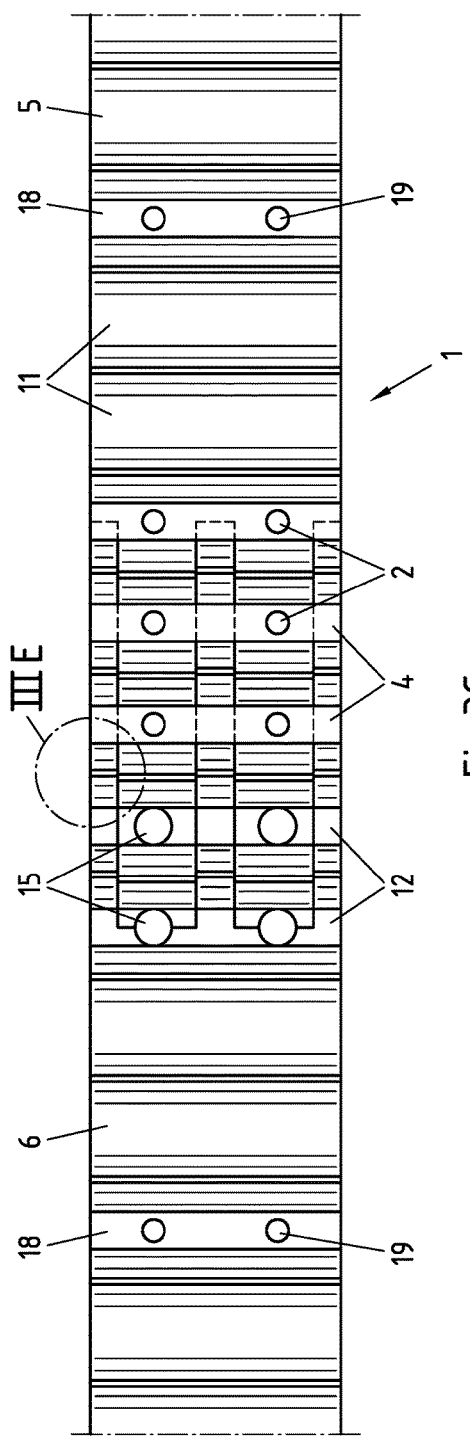
FIG. 3C is a view from below of the timing belt of FIG. 3A in the mounted condition under no tension.

FIG. 3C shows a view from below of the timing belt 1 of FIG. 3A in the mounted condition under no loading. The description view from below indicates a view from below of the front side 10, that is to say the side of teeth 11. It is clearly evident that the flanks of teeth 11 in the area of the belt lock are not aligned, but offset.

Figure 3E:
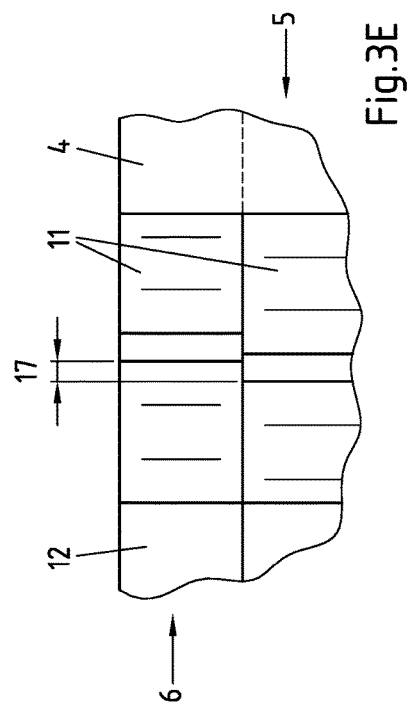
FIG. 3E is a detail view of the area of the timing belt designated with "III E" in FIG. 3C.
Figure 3D:
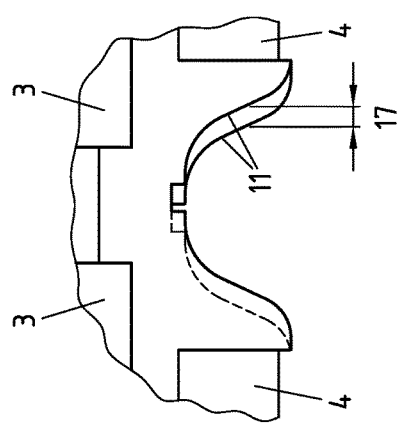
FIG. 3D is a detail view of the area of the timing belt designated with "III D" in FIG. 3A.

FIG. 3D shows a detail view of the area of timing belt 1 designated with "III D" in FIG. 3A. By contrast, FIG. 3E shows a detail view of the area of timing belt 1 designated with "III E" in FIG. 3C. The enlarged views in FIGS. 3D and 3E show particularly plainly that tooth 11 of tine 7 on first end 5 is offset 17 with respect to the tooth 11 of tine 7 on second end 6. In particular, the flanks of the teeth are not arranged in line with each other.

In FIG. 4A, a side view of a timing belt 1 according to the invention is shown, mounted and under tension. The timing belt 1 represented in FIG. 4A is exposed to a tensile force F, which typically arises during operation, as a result of a pretension, for example. Since timing belt 1 has significantly lower tensile stiffness than exists in the rest of the belt 1, tensile force F causes the belt to stretch in the area of the belt lock, whereas elongation in the rest of the belt 1 is negligible.

The increased elongation in the area of the belt lock is attributable on the one hand to the fact that the tensile elements typically present in the belt 1 are split there, and on the other hand because despite the solid connection between the two ends 5, 6, a very small relative movement between the tines 7 on the two ends 5, 6 cannot be completely eliminated. This has the result that the offset 17 in the condition without tension is no longer present in the condition under tension shown in FIG. 4A, and now the two connecting elements 18, which enclose the area of the belt lock, are also located at a distance A from one another. The dimension A-X resulting from offset 17 thus changes into the desired nominal dimension A in the condition under tension. Instead of offset 17, a gap 20 having a length approximately equal to the length of offset 17 has arisen between the ends of tines 7 and the ends of recesses 8.

FIG. 4B is a top view of the timing belt 1 of FIG. 4A, looking towards rear side 9 of belt 1, which is mounted and under tension. In this figure too, it may be seen that under the effect of tensile force F, belt 1 has no offset in the area of the belt lock any more, and the two connecting elements 18 arrange in this area are at a distance A from each other. The gaps 20 that have been created are also clearly visible.

FIG. 4C shows a view from below of the timing belt 1 of FIG. 4A, seen from the front side 10. In this illustration too, it may be seen that under the effect of tensile force F, belt has no offset any more, and the flanks of teeth 11 in the area of the belt lock are aligned with each other again. Gaps 20 are also clearly visible.

FIG. 4D shows a detail view of the area of timing belt 1 designated with "IV D" in FIG. 4A. By contrast, FIG. 4E shows a detail view of the area of timing belt 1 designated with "IV E" in FIG. 4C. The enlarged views in FIGS. 4D and 4E show particularly plainly that teeth 11 have been shifted to their desired operating position under the effect of tensile force F, and that in this position there is no longer any offset between teeth 11. In other words, the flanks of teeth 11 are now in line with each other again. Finally, FIGS. 4D and 4E clearly show that gaps 20 are also formed between teeth 11 and corresponding inserts 4. Gap 20 is formed on the respective unloaded side of insert 4, whereas on the loaded side insert 4 lies flush against tooth 11.

The invention claimed is:

1. A timing belt, particularly a toothed belt, having a first end, a second end, a rear side, a front side, and having a plurality of teeth arranged on the rear side and/or the front side, wherein the first end has at least one cutaway, wherein the second end has at least one tine that is insertable into the cutaway, and wherein the first end and the second end are detachably connectable to each other by connecting means, wherein,
in a connected condition under no tension the teeth of the first end have an offset relative to the teeth of the second end.

2. The timing belt according to claim 1, wherein the offset has a length between 0.1 mm and 1.5 mm.

3. The timing belt according to claim 1, wherein the timing belt has back panels and/or inserts as connecting means.

4. The timing belt according to claim 1, wherein the tines have recesses on the rear side thereof for accommodating the back panels.

5. The timing belt according to claim 1, wherein the tines have grooves on the front side thereof for accommodating the inserts.

6. The timing belt according to claim 1, wherein the grooves and/or recesses are arranged eccentrically relative to the teeth in a longitudinal direction of the belt.

7. The timing belt according to claim 1, wherein the tines of the first end and/or the second end have through holes which extend from the rear side to the front side of the belt.

8. The timing belt according to claim 1, wherein the timing belt has connecting elements.

9. The timing belt according to claim 1, wherein the tines and the recesses are from six to fourteen teeth long.

10. The timing belt according to claim 1, wherein the timing belt is made from plastic and comprises tensile elements made from metal, particularly steel.

* * * * *

UNITED STATES PATENT AND TRADEMARK OFFICE
CERTIFICATE OF CORRECTION

PATENT NO. : 9,683,630 B2
APPLICATION NO. : 15/021084
DATED : June 20, 2017
INVENTOR(S) : Jurgen Vollbarth et al.

It is certified that error appears in the above-identified patent and that said Letters Patent is hereby corrected as shown below:

On the Title Page

Column 1, insert:
Item -- (30), Foreign Application Priority Data, Sep. 12, 2013 (DE) 10 2013 110 027.9 --

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*